Patented June 2, 1953

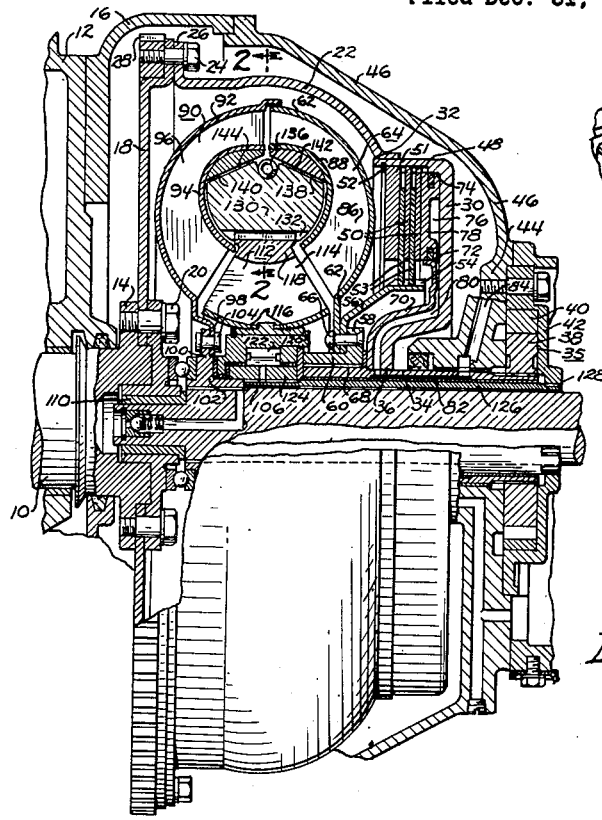

2,640,572

UNITED STATES PATENT OFFICE 2,640,572

LOCK-UP CLUTCH IN A FLUID TORQUE CONVERTER

James H. O'Brien, Detroit, Mich., assignor to Packard Motor Car Company, Detroit, Mich., a corporation of Michigan Application December 31, 1947, Serial No. 795,162

18 Claims. (Cl. 192—3.2)

This invention relates to transmissions, and more particularly to means for automatically interrupting operation of a fluid transmission and interconnecting a fluid energizing impeller and an energy absorbing turbine under certain conditions of operation.

An object of this invention is to provide a clutch carried by a rotatable reaction member to clutch impeller and turbine members together when the reaction member reaches a substantially predetermined speed of forward rotation in a fluid circuit.

Another object of the invention is to provide a fluid transmission capable of operating as a torque converter or as a fluid coupling, and wherein a clutch carried by the reaction member is provided to clutch the impeller and turbine members together in response to predetermined working conditions.

A further object resides in the provision of a fluid transmission having a fluid circuit defined by rotatable impeller, turbine and reaction members wherein means are provided to lock the reaction member against backward rotation in the fluid circuit to operate the transmission as a torque converter when torque multiplication is required to transmit the load to which the turbine is subjected, and to permit the reaction member to rotate forwardly in the circuit when torque multiplication is not required, and wherein means responsive to predetermined forward speed of rotation of the reaction member are provided to lock the impeller and turbine members together to interrupt operation of the fluid unit.

Yet another object is to provide a centrifugally actuated clutch carried by a reaction member shroud and controlled by the speed of rotation of the reaction member to clutch together a fluid energizing impeller and an energy absorbing turbine.

Still a further object of the invention resides in the provision of an automatically operated fluid transmission capable of functioning as a torque converter, a fluid coupling or as a direct mechanical drive.

Other objects of this invention will appear in the following description and appended claims, reference being had to the accompanying drawings forming a part of this specification wherein like reference characters designate corresponding parts in the several views.

Fig. 1 is a longitudinal view, partly in a section of a transmission embodying the present invention.

Fig. 2 is a fragmentary sectional view taken substantially on the line 2—2 of Fig. 1, looking in the direction of the arrows.

Fig. 3 is a fragmentary sectional view illustrating a modified form of the invention.

Fig. 4 is a fragmentary sectional view taken substantially on the line 4—4 of Fig. 3, looking in the direction of the arrows.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now more particularly to Fig. 1 it will be noted that a crankshaft or driving shaft 10 journalled in an engine block 12 is provided with a flange 14 positioned in a forward transmission housing 16 secured to the engine block 12. A driving disk 18 secured to the flange 14 of the crankshaft 12 as by bolts 20 is connected in driving relation with an impeller driving shell 22 by bolts 24 extending through a flange 26 of the shell 22, and extending into an engine starter gear 28.

An impeller clutch driving member 30 secured to the shell 22 as by brazing or welding illustrated at 32 has its inner end secured to a pump driving sleeve 34 as by brazing or welding illustrated at 36. The driving sleeve 34 is splined to a pump impeller 38 adapted to drive a rotor 40 in a pump housing 42 secured to a wall 44 of a casing 46 secured to the forward housing 16 and surrounding the impeller driving shell 22.

The outer axially extending portion of the clutch driving member 30 is provided with internal splines 48 adapted to receive driving disks 50 and a backing plate 51 held against axial displacement in one direction by a snap ring 52. The driving disks 50 are alternately spaced with reference to driven disks 53 having their inner ends mounted on splines 54 of an impeller driving member 56. The member 56 is secured to a flange 58 of a hub 60 and to an outer web 62 of an impeller 64 of a power transmitting fluid unit in any convenient manner as by rivets 66. The hub 60 is mounted on a bearing 68 surrounding the pump driving sleeve 34.

A member 70 extending in parallel relation with the inner portion of the clutch driving member 30 has its inner edge secured to the pump driving sleeve 34 as by welding or brazing. The outer end 72 of the member 70 is flanged axially and extends in parallel relation with a cylindrical portion 74 of the clutch driving member 30 to provide a ring type cylinder 76 therebetween. A piston 78 is slidably mounted in the cylinder 76 for movement toward the backing plate 51 to urge the driving and driven disks 50 and 53 into engagement with each other to drive the impeller 64. Fluid under pressure from the pump driven by the sleeve 34 may be supplied to the cylinder 76 through interconnected passages 80, 82 and 84 communicating with the discharge side of the pump.

The impeller 64 is provided with spaced fluid energizing blades 86 secured to the outer web 62 and to an inner shroud 88 in any suitable manner as by welding. A turbine 90 is positioned in driven relation with the impeller 64 and is provided with spaced outer web and inner shroud members 92 and 94 having spaced energy absorbing vanes 96 interposed therebetween. The turbine web 92 is provided with an inwardly extended flange 98 secured to a flange 100 of a hub 102 in any convenient manner as by rivets 104. The hub 102 is secured as by splines to a driven shaft 106 journalled in a bushing 110 in the end of the crankshaft 10. Any suitable gearing may be associated with the driven shaft 106 to provide desired speed reductions to a final driven or tail shaft operably connected thereto.

A reaction member 112 having fluid deflecting blades 114 fixed to spaced outer web and inner shroud members 116 and 118 is interposed between the turbine 90 and the impeller 64 preferably at substantially the point of minimum radius of the fluid circuit. The web 116 of the reaction member is secured to a hub 120 mounted on a one-way clutch 122, which in turn is mounted on a stationary hub 124 splined to a sleeve 126 fixed to the casing 46 by splines 128. The blades 114 are contoured in such a manner that when torque multiplication is required to transmit the load to which the driven shaft 106 is subjected, the fluid issuing from the turbine 90 impinges against the front faces of the blades to exert a backwardly directed force thereagainst. Since the reaction member 112 is locked against backward rotation power is transmitted from the driving shaft to the driven shaft with a multiplication of torque and a reduction of speed.

As the speed of the turbine relative to the impeller increases, the direction of flow of fluid issuing from the turbine 90 changes to impinge against the rear faces of the blades 114 of the reaction member 112 to exert a force thereon to rotate it in the forward direction on the one-way clutch 122. The device then operates as a fluid coupling to transmit power at a relatively high speed ratio with no increase in torque. The inner shrouds 88, 94 and 118 carried by the impeller 64, turbine 90, and reaction member 112 cooperate to deflect the circulating fluid to flow in an efficient manner whereupon boundary losses due to turbulence or cavitation between the impeller and the turbine are minimized.

Means operated by predetermined forward speed of rotation of the reaction member 112 in the fluid circuit are provided to clutch the impeller and turbine members 64 and 90 together to transmit power directly from the impeller to the turbine through a mechanical connection thereby rendering the fluid unit inoperable.

One illustrative form of such automatically operated means includes a centrifugal clutch carried by the reaction member and having a plurality of circumferentially spaced clutch members 130 mounted for radial movement on splines 132 carried by the shroud 118. The clutch members 130 have angularly related surfaces 138 and 140 adapted to engage reversely disposed clutch surfaces 142 and 144 carried by the impeller and turbine shroud members 88 and 94 respectively to clutch the impeller and turbine members together when the clutch members 130 are moved outwardly by a centrifugal force developed by predetermined forward rotation of the reaction member 112 in the fluid circuit while the device is operating as a fluid coupling. Yielding means such for example as a retracting spring 136 surrounding the clutch members 130 is provided to urge them inwardly toward the disengaged position.

It will be apparent that the time of engagement of the centrifugally actuated clutch to clamp the turbine 90 to the impeller 64 and transmit a direct drive from the driving shaft 10 to the driven shaft 106 is dependent on the forward speed of rotation of the reaction member 112 when the device is operating as a fluid coupling. The speed of rotation of the reaction member is determined by the reaction exerted thereon by the circulating fluid issuing from the turbine 90. The reaction exerted on the blades 114 of the reaction member is dependent on the angularity of the flow of fluid issuing from the turbine. This angularity of flow varies through wide limits depending on the ratio between the power applied to the driving shaft and the load to which the driven shaft is subjected and other factors. When the device is operating as a fluid coupling the fluid reaction exerted on the reaction member is of course a function of the angularity of the flow of fluid issuing from the turbine 90. The angularity of this fluid flow from the turbine 90 is in turn dependent on the ratio of the speed of the turbine relative to the impeller 64.

The operation is as follows: When the fluid unit is operating as a torque converter the one-way clutch 122 locks the reaction member 112 against reverse rotation in the fluid circuit, and the retracting spring 136 maintains the centrifugally actuated clutch members 130 carried by the reaction member out of engagement with the clutch surfaces 142 and 144 of the impeller and turbine members. The blades 114 of the stationary reaction member 112 redirect the fluid from the turbine to the impeller in such a manner that increased torque is transmitted through the fluid from the impeller 64 to the turbine 90.

When the device is operating as a fluid coupling the reaction member 112 rotates forwardly in the fluid circuit, on the one-way clutch 122, and power is transmitted from the impeller to the turbine with no multiplication of torque.

As the speed of rotation of the reaction member increases, the centrifugal force exerted on the clutch members 130 overcomes the force exerted by the retracting spring 136, and the frictional forces resisting outward movement of the clutch members 130. The clutch members then move outwardly on the splines 134 to engage their friction surfaces 138 and 140 with the friction surfaces 142 and 144 of the impeller and turbine members 64 and 90 whereupon the impeller, turbine and reaction members rotate as a unit. Power is then transmitted directly from the impeller to the turbine through the clutch members 130 at a 1 to 1 speed ratio, and the fluid unit is rendered inoperative.

When the power applied to the impeller is insufficient to drive the load to which the turbine is subjected at a 1 to 1 speed ratio the unit slows down. When the speed decreases to such a point that the clutching force exerted by the clutch members 130 is less than the torque required to drive the turbine at a 1 to 1 speed ratio with the impeller, the retracting spring 136 overcomes the centrifugal force exerted by the clutch members 130. Slippage then occurs between the clutch members and the impeller and turbine members whereupon the speed of the impeller increases relative to the turbine, and the clutch members 130 shift inwardly to the disengaged position. The impeller and turbine members are then free to rotate relative to each other, whereupon the unit functions as a fluid coupling or as a torque converter depending on whether or not torque multiplication is required to transmit the load to which the turbine is subjected.

It will be apparent that the clutch members 130 rotate about a larger radius when they are engaged with the impeller and turbine members than when they are in the disengaged position. The centrifugal forces exerted on the clutch members are therefore higher when they are engaged than when they are disengaged. The clutch members therefore disengage at a slower reaction member speed than is required to move them to the engaging position. A time lag is thus introduced for releasing the turbine from the impeller whereupon a hunting action that would cause erratic operation is eliminated.

Figs. 3 and 4 illustrate a modified form of speed responsive clutch carried by the reaction member 112 for clutching the impeller and turbine members 64 and 90 together when the reaction member reaches a predetermined speed of rotation in the fluid circuit.

The reaction member 112 is provided with a shroud 150 secured to the blades 114, and having radially extended portions 152 and 154 terminating in oppositely directed flanges having axially extended splines 156 and 158. Axially movable clutch members 160 and 162 are carried by the reaction member 112 and have conical shaped friction surfaces adapted to engage reversely disposed friction surfaces 164 and 166 carried by the impeller and turbine shroud members 88 and 94 respectively. The clutch members 160 and 162 have splined inner edges 168 and 170 extending in driven engagement with the splines 156 and 158 of the reaction member shroud 150, and move axially thereon in opposite directions to engage their friction surfaces with the friction surfaces 164 and 166 of the impeller and turbine members 64 and 90 respectively.

Speed responsive motion transmitting means may be provided to move the clutch members 160 and 162 axially in opposite direction to clutch the turbine to the impeller. One illustrative example of such means includes a plurality of circumferentially spaced weights 172 positioned between the shroud 150 and the clutch members 160 and 162 to move spaced balls 174 radially outwardly to engage angularly related surfaces 176 and 178 of the clutch members 160 and 162 to shift the clutch members axially in opposite directions to clutch the impeller and turbine members together.

A retracting spring 180 positioned in slots 182 formed in the weights 172 and held in place therein by strips 184 secured to the weights by pins 186 slidably mounted in slots 188 is provided to urge the weights 172 inwardly against the centrifugal force exerted thereon by rotation of the reaction member 112. Yielding means such for example as a plurality of spaced springs 190 mounted on pins 192 may be provided to urge the clutch members 160 and 162 toward each other to the disengaged position.

The operation of this embodiment of the invention is as follows. When the device is operating as a fluid coupling the reaction member 112 rotates forwardly in the fluid circuit. When the centrifugal force exerted by the clutch actuating weights 172 is sufficient to overcome the resistance of the return springs 180 and 190, the weights move outwardly. The balls 174 actuated by the springs 172 and engaging the angularly related surfaces 176 and 178 of the clutch members 160 and 162 shift the clutch members axially in opposite directions on the splines 156 and 158 to engage their friction surfaces with the friction surfaces 164 and 166 of the impeller and turbine members 64 and 90 respectively. The impeller, turbine and reaction members are then clutched together and rotate in unison.

The turbine 90 is of course automatically released from the impeller 64 when the power applied to drive the impeller is not sufficient to maintain a predetermined speed of rotation of the assembly. When the force exerted by the clutch releasing springs 180 and 190 overcomes the centrifugal force and friction of the mechanism the weights 172 shift radially inwardly and the clutch members release the friction surfaces 164 and 166 carried by the impeller and turbine members. The unit then functions as a fluid coupling or torque converter depending on the ratio of power applied to the impeller and the load to which the turbine is subjected.

It will be apparent that any type of speed responsive or centrifugally actuated clutch carried by the reaction member may be employed to automatically clutch the impeller and turbine members together to transmit power from a driving shaft to a driven shaft at a 1 to 1 ratio under conditions whereby the fluid unit is rendered inoperative.

It will be apparent that it is within the scope of this invention to employ a speed responsive clutch carried by the reaction member to clutch the reaction member to either the impeller or to the turbine to operate the reaction member as an auxiliary impeller or as an auxiliary turbine. Where this embodiment is employed any suitable speed responsive or centrifugally actuated means may be employed to actuate the clutch, which may be of any suitable type known in the art for interconnecting concentrically rotating members.

I claim:

1. The combination with the impeller and turbine members of a fluid transmission, of a reaction member interposed between the impeller and turbine members, clutch means including a centrifugally actuated radially movable clutch member carried by the reaction member, said clutch member engaging against both the impeller and turbine members to clutch the impeller and turbine members together, and yielding means urging said clutch member toward the disengaged position.

2. The combination with the impeller and turbine members of a fluid transmission, of a reaction member interposed between the impeller and turbine members, an axially movable centrifugally actuated clutch member carried by the reaction member to clutch the impeller and turbine members together, and yielding means urging said clutch member toward the disengaged position.

3. A fluid transmission comprising impeller and turbine members defining a power transmitting fluid circuit, a reaction member in said circuit, means to lock the reaction member against rotation in one direction and to permit it to rotate freely in the other direction, and a radially movable centrifugally actuated clutch member carried by the reaction member, said clutch member engaging against both the impeller and turbine members to clutch the reaction member to the impeller and turbine members.

4. The combination with the impeller and turbine members of a torque converter, of a reaction member interposed between the impeller and turbine members, and clutch means on said reaction member, said clutch means having centrifugally actuated means cooperating with the impeller and turbine members to clutch the impeller and turbine members together, and one-way braking means to lock the reaction member against rotation in one direction.

5. In a torque converter, a fluid energizing impeller member, an energy absorbing turbine member, a reaction member interposed between the impeller and turbine members and cooperating therewith to form a power transmitting fluid circuit, cooperating inner shrouds carried by said members, one-way braking means to lock the reaction member against reverse rotation in the fluid circuit, and a centrifugally actuated clutch device carried by the reaction member and operating through said shroud to clutch the impeller and turbine members together upon predetermined forward rotational speed of the reaction member in the fluid circuit.

6. The combination with the impeller and turbine members of a fluid transmission, of a reaction member interposed between the impeller and turbine members, one-way braking means to lock the reaction member against rotation in one direction to operate the transmission as a torque converter and to release it for rotation in the opposite direction to operate the transmission as a fluid coupling, and axially movable centrifugally actuated friction means responsive to predetermined rotational speed of the reaction member to clutch the impeller and turbine members together.

7. In a fluid transmission having impeller and turbine members defining a power transmitting fluid circuit, a reaction member positioned in the fluid circuit at substantially the point of minimum radial distance of said circuit, one-way braking means to lock the reaction member against reverse rotation in the fluid circuit when the transmission is operating as a torque converter and to permit it to rotate forwardly in the fluid circuit under the influence of fluid reaction when the transmission is operating as a fluid coupling, speed responsive clutching means including radially movable elements carried by the reaction member, said clutching means engaging against both the impeller and turbine members to clutch the turbine to the impeller when the reaction member approaches a predetermined speed of forward rotation in response to fluid reaction in the fluid circuit, and yielding means urging the speed responsive clutching means toward the released position.

8. The combination with the impeller and turbine members of a fluid transmission, of a reaction member interposed between the impeller and turbine members, one-way braking means to lock the reaction member against rotation in one direction to operate the transmission as a torque converter and to release it for rotation in the opposite direction to operate the transmission as a fluid coupling, and radially movable means carried by the reaction member and responsive to predetermined variation in the direction of the flow of fluid from the turbine to the impeller, and said radially movable means being adapted to engage against the impeller and turbine members to clutch the impeller and turbine members together.

9. The combination with fluid energizing and energy absorbing members of a fluid transmission having aligned inner shrouds, of a rotatable member interposed between said members and having an inner shroud aligned with the shrouds of said members, and speed responsive friction means carried by said rotatable member and positioned entirely within all of said shrouds to clutch the rotatable member to said fluid energizing and energy absorbing members.

10. The combination with fluid energizing and energy absorbing members of a fluid transmission, of a reaction member interposed between said members, and radially movable speed responsive means carried by said reaction member, said speed responsive member engaging said energizing and energy absorbing members to clutch the fluid energizing and energy absorbing members together.

11. A fluid transmission comprising impeller turbine and reaction members defining a power transmitting fluid circuit, a centrifugally actuated clutch member including a plurality of radially movable friction elements carried by the reaction member, said clutch member engaging said impeller and turbine members to clutch the impeller and turbine members together, and yielding means urging the friction elements toward the releasing position.

12. In a fluid transmission, spaced impeller turbine and reaction members defining a power transmitting fluid circuit and including aligned inner shrouds, a centrifugally actuated friction clutch member positioned within the aligned shrouds, said clutch member being carried on and being centrifugally responsive to the speed of rotation of said reaction member, and said clutch member engaging said impeller and turbine members to clutch said impeller turbine and reaction members together in response to predetermined speed of rotation of said reaction member.

13. The combination with the impeller and turbine members of a fluid transmission, of a reaction member cooperating with the impeller and turbine members to form a power transmitting fluid circuit, aligned inner shrouds carried by said members, and a speed responsive clutch member carried by the reaction member and including a plurality of radially movable friction members positioned within said inner shrouds, said friction members engaging said impeller and turbine members to connect the impeller turbine and reaction members together in response to predetermined speed of rotation of the reaction member.

14. In a torque converter, a fluid energizing impeller member, an energy absorbing turbine member, a reaction member interposed between the impeller and turbine members and cooperating therewith to form a power transmitting fluid circuit, cooperating inner shrouds carried by the impeller and turbine members and the reaction member, one-way braking means to lock the reaction member against reverse rotation in the fluid circuit, an axially movable device carried by the reaction member and positioned within said shrouds, and centrifugal means acting on said device to clutch the reaction member to the impeller and turbine members when the reaction member reaches a substantially predetermined forward rotational speed in the fluid circuit.

15. The combination with the impeller and turbine members of a fluid transmission, of a reaction member interposed between the impeller and turbine members, one-way braking means to lock the reaction member against rotation in one direction to operate the transmission as a torque converter and to release it for rotation in the opposite direction to operate the transmission as a fluid coupling, axially movable means carried by the reaction member, and means actuating said axially movable means and operable upon the attainment of a predetermined speed of rotation of the reaction member in said opposite direction to clutch the turbine to the impeller.

16. The combination with the impeller turbine and reaction members of a fluid transmission, of a centrifugal clutch carried by and being responsive to the speed of rotation of the reaction member, said clutch including radially movable friction members, said friction members engaging said impeller and turbine members to clutch said members together in response to predetermined speed of rotation of the reaction member.

17. The combination with the impeller and turbine members of a fluid transmission, of a reaction member cooperating with said impeller and turbine members, clutch means including a movable clutch member carried by the reaction member, said clutch engaging said impeller and turbine members, and centrifugal actuating means for said clutch means responsive to the speed of rotation of said reaction member to cause the latter to clutch the impeller and turbine members together.

18. The combination with the impeller and turbine members of a fluid transmission, of a reaction member, a single clutch means, said clutch cooperating with said members to connect the impeller and turbine members and the reaction member together, and centrifugal actuating means carried by and being responsive to the speed of said reaction member for effecting the operation of said clutch means.

JAMES H. O'BRIEN.

References Cited in the file of this patent

UNITED STATES PATENTS

| Number | Name | Date |
| --- | --- | --- |
| 2,205,794 | Jandasek | June 25, 1940 |
| 2,235,673 | Dodge | Mar. 18, 1941 |
| 2,255,591 | Simpson | Sept. 9, 1941 |
| 2,313,645 | Jandasek | Mar. 9, 1943 |
| 2,339,483 | Jandasek | Jan. 18, 1944 |
| 2,360,710 | Nutt et al. | Oct. 17, 1944 |

FOREIGN PATENTS

| Number | Country | Date |
| --- | --- | --- |
| 191,022 | Great Britain | Nov. 8, 1923 |